Patented Oct. 26, 1926.

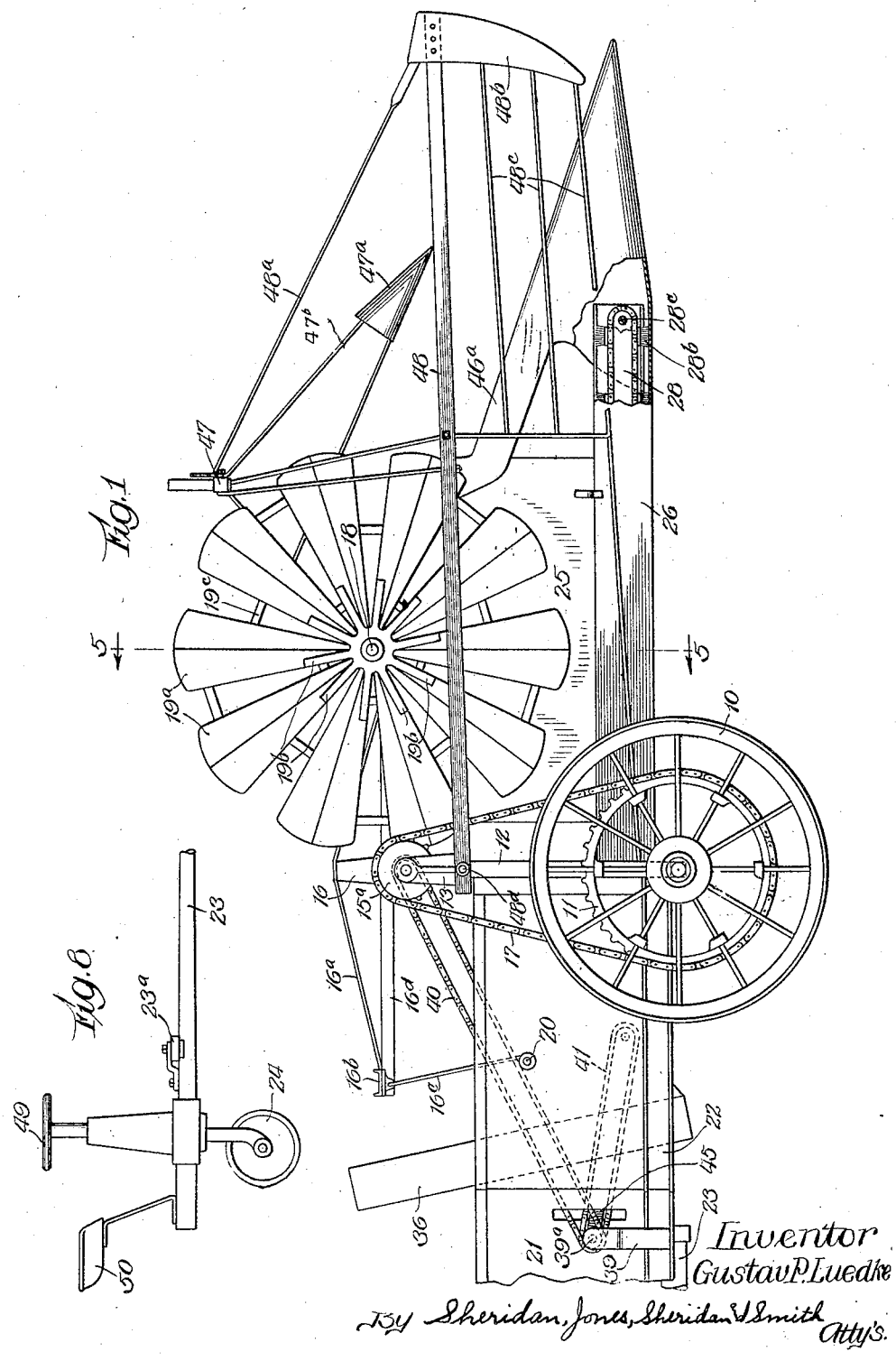

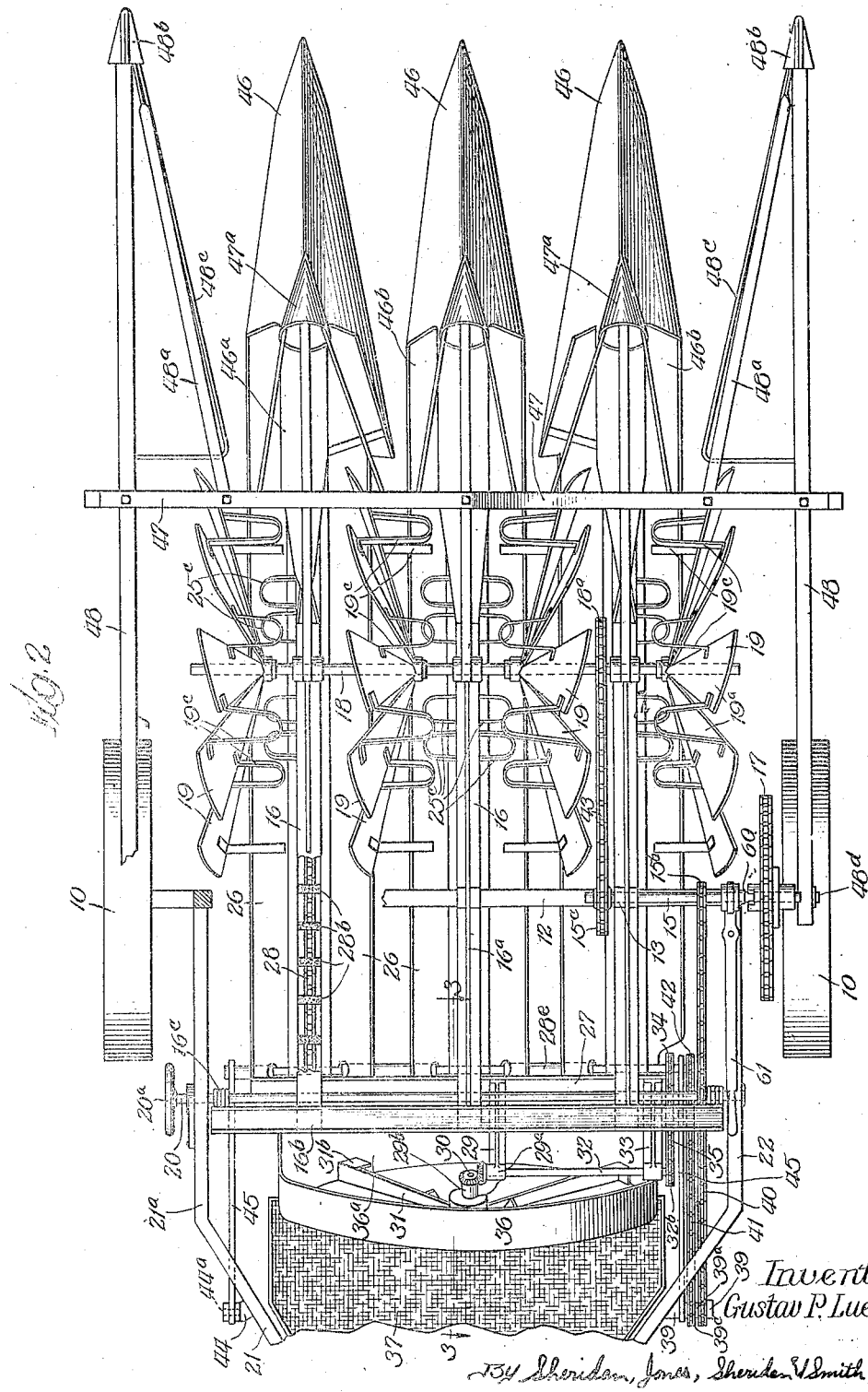

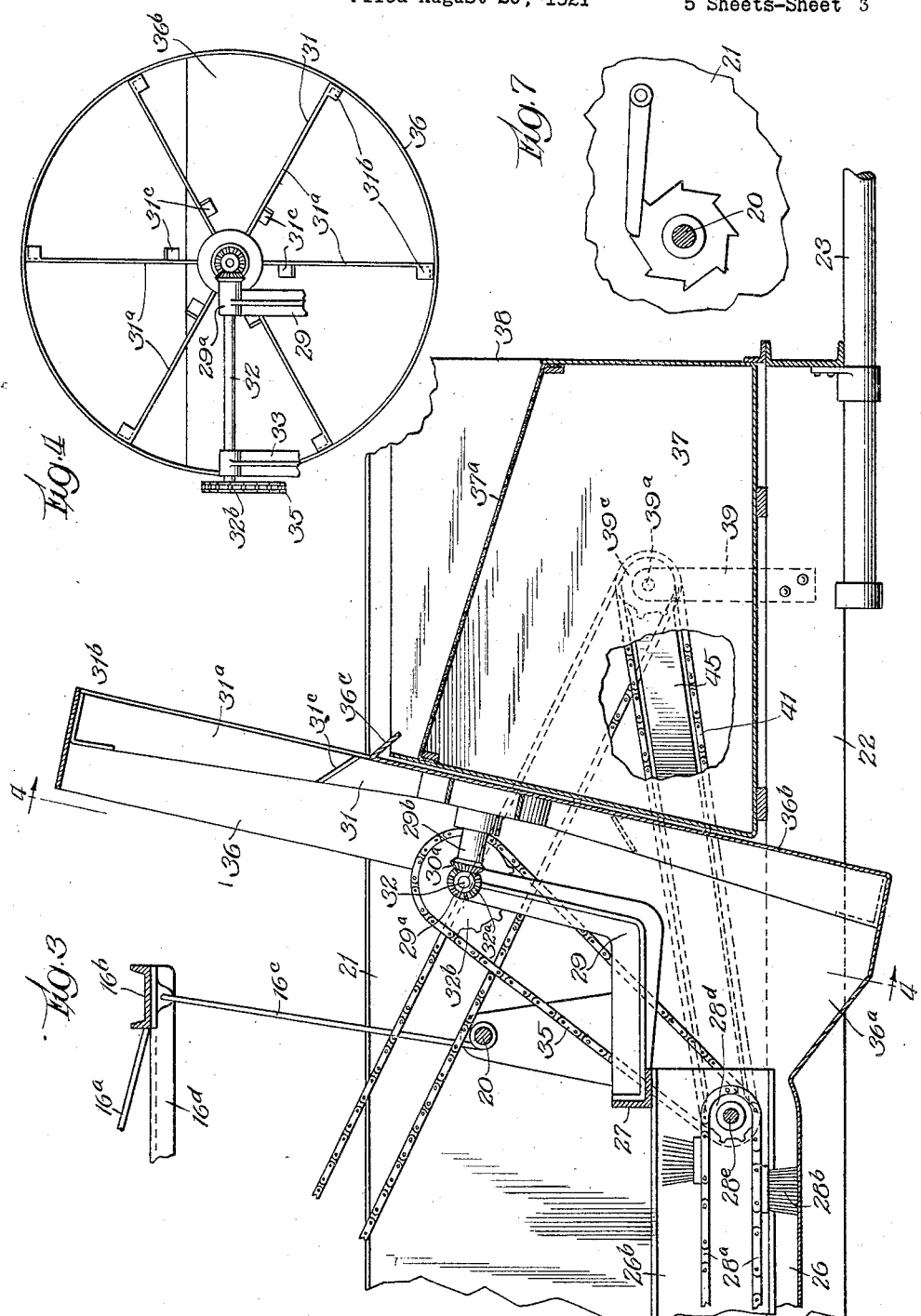

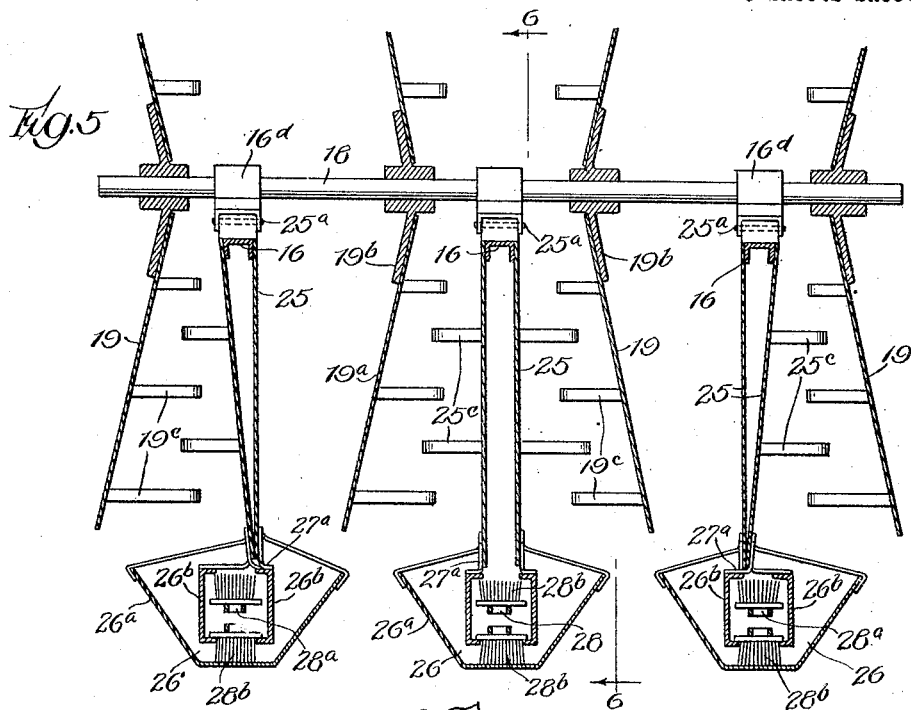
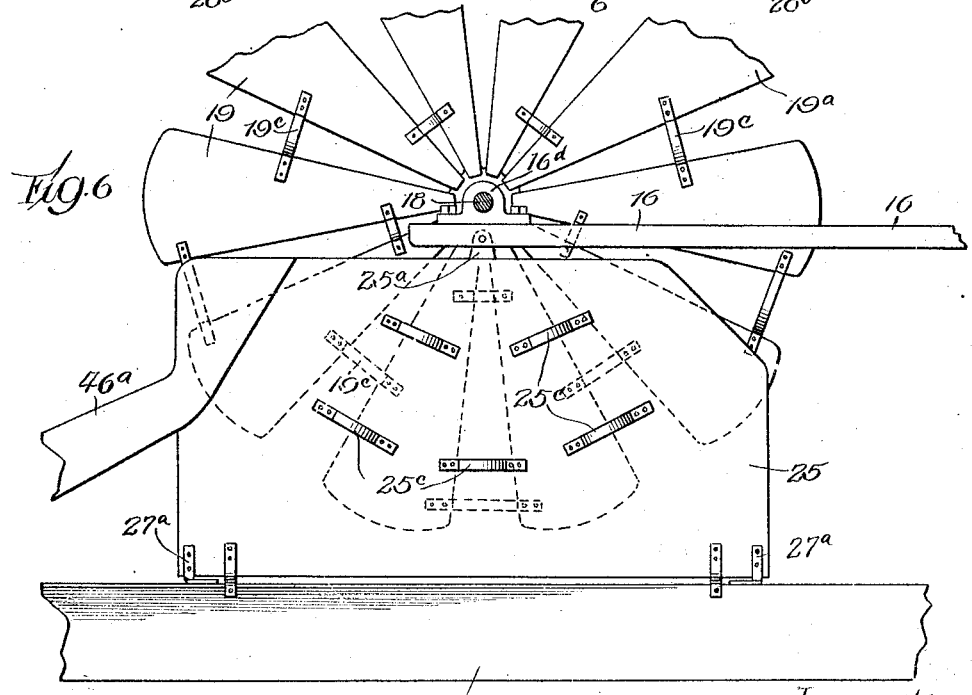

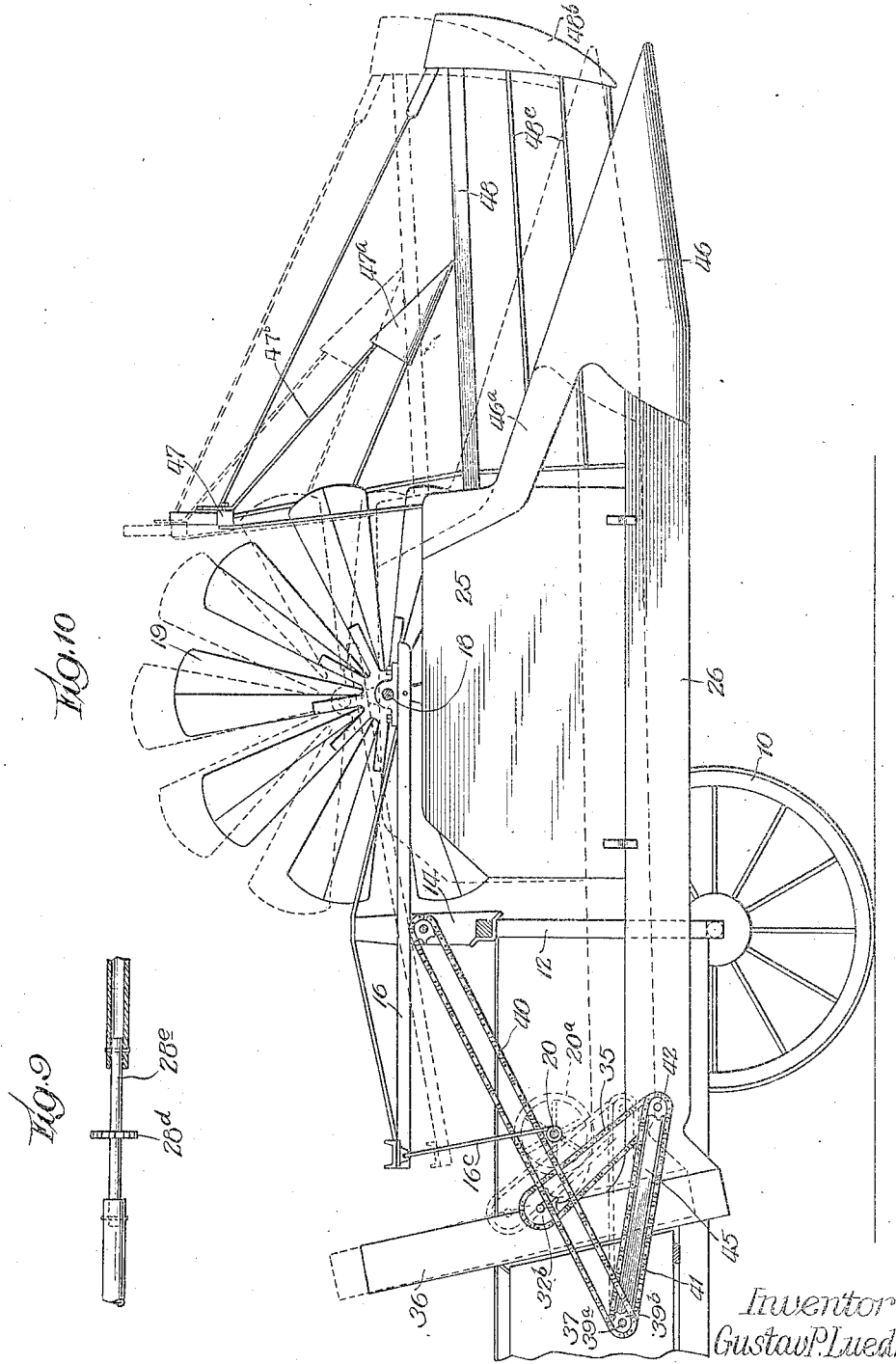

1,604,458

UNITED STATES PATENT OFFICE.

GUSTAV PAUL LUEDKE, OF SPRINGFIELD, ILLINOIS.

THRASHING MACHINE.

Application filed August 20, 1921. Serial No. 493,890.

This invention relates to improvements in thrashing machines, and more particularly to machines of this character designed to harvest seeds and grain from the standing vegetation in such manner that the latter will be left standing after the thrashing operation and ready to be turned under whenever desired, thus obviating the work of cutting, shocking, stacking, and subsequent thrashing, in the manner now customary in present day practice. More particularly stated, the invention relates to improvements in thrashing machines such as described in my prior Patent No. 1,379,112, issued May 24, 1921.

The primary object of the present invention is to improve, with a view to increased efficiency, the construction, arrangement of parts, and operation of the machine disclosed in this earlier patent, particularly with regard to the thrashing mechanism, the adjustment of the latter and related parts to accommodate vegetation of different heights, and the grain-collecting and conveying means.

Other objects of the invention will appear from the following specification, taken in connection with the accompanying drawings, wherein one form of the invention is illustrated.

Figure 1 is a side elevation of the machine, parts being broken away, in order to illustrate certain of the elements more in detail;

Fig. 2 is a plan view of the machine;

Fig. 3 is a sectional view, taken on the line 3—3 of Fig. 2;

Fig. 4 is a section on the line 4—4 of Fig. 3, showing the grain elevating wheel in detail;

Fig. 5 is a section on the line 5—5 of Fig. 1;

Fig. 6 is a fragmentary view, taken on the line 6—6 of Fig. 5;

Fig. 7 is a detail view showing the locking pawl for the hoisting mechanism;

Fig. 8 is a side elevation of the rear of the machine, showing the driver's seat and steering mechanism;

Fig. 9 is a detail view of the conveyor driving shaft;

Fig. 10 is a side elevation of the machine showing the raising and lowering mechanism and related parts in detail, many of the other parts being omitted;

Referring more in detail to the drawings—

10 designates the two forward supporting or traction wheels of the machine, one of which carries a driving element in the form of a large sprocket wheel 11. The wheels 10 are mounted on the opposite ends of an arched axle 12, which supports or carries substantially the entire weight of the machine. Mounted in suitably spaced relation upon the raised horizontal portion of the axle 12 are a plurality of upstanding bearings 13 and 14, the former supporting a transverse shaft 15 and the latter an oscillatory or tiltable frame 16. The shaft extends only part way across the machine, and is provided adjacent its outer end with a sprocket wheel 15$^a$, through which and the drive chain 17 the shaft is driven from the main drive sprocket 11, previously described.

The tiltable frame 16 is made up of a plurality of longitudinally extending beams or angle irons 16$^d$, properly reinforced by struts or the like 16$^a$ extending longitudinally of the machine and by transverse beams 16$^b$, which may also be of angle iron construction. As previously pointed out, the tiltable frame is pivotally mounted on bearings 14, which extend up from the horizontal arched portion of the axle 12. The frame, at its forward end, carries a transverse shaft 18 mounted in suitable bearings carried by the longitudinal beams of said frame. Keyed to the shaft 18, and adapted to rotate therewith, are a plurality of thrashing wheels 19, which are properly spaced transversely of the machine, in order to provide a plurality of thrashing zones, as will be more particularly hereinafter described.

Suitable cables 16$^c$ or the like are attached at one end to the rear of the frame 16, their other ends being attached to a transverse hoisting shaft 20, the latter being suitably mounted in bearings mounted in the side walls 21$^a$ of the box 21, which latter extends rearwardly of the axle 12 and which houses the rear portion of the conveying mechanism, the grain-elevating mechanism, and the storage bin, as will be hereinafter more fully pointed out. The box 21 is mounted on a rearwardly projecting frame 22, carried at its forward end by the axle 12 and at its rear end supported on the forward end of the pole or shaft 23, the latter, in turn, being supported by the small steering wheel 24 at the rear of the machine. From this it will be apparent that the box is stationary, or, in other words, not movable with respect to the axle. The hoisting shaft 20, being mounted in the bearings in the side walls of the box 21, is likewise stationary, and hence upon rotation, through a suitable hand wheel 20ª or the like, the frame 16 will be oscillated or tilted about its pivots in such wise as to raise or lower the outer end of said frame, as will be readily understood. The rotation of the hoisting shaft may be controlled, if desired, by means of suitable ratchet and pawl mechanism, such as shown in Fig. 7 of the drawings.

The thrashing wheels 19 (four being shown in the drawings by way of illustration) comprise a plurality of radially disposed fan blades 19ª, suitably reinforced by spoke-like members 19ᵇ. Each of these thrashing wheels carries on its operating side a plurality of spaced apart thrashing elements 19ᶜ, the latter being shown in the form of loops and preferably formed from small strips of metal bent into substantially U shape and flanged at their free ends for attachment to the fan blades, as shown. Each of the thrashing wheels shown in the drawings is provided with three series of these thrashing elements, said series being disposed concentrically upon the wheel.

The thrashing wheels 19, upon operation of the machine, coact with stationary thrashing members 25, there being three of these members shown in the drawings, one for each of the outside thrashing wheels, and one center or intermediate member which is common to both the intermediate thrashing wheels. These stationary thrashing members are pivotally mounted on the oscillating frame 16, adjacent the outer end thereof, the supporting bearings 25ª being carried by the longitudinal beams 16ᵈ. As will appear from the drawings, these members 25 are swung from the frame 16 in such wise as to cover the lower portions of the thrashing wheels, said members being mounted in rather close proximity to the active faces of said wheels, but spaced sufficiently therefrom to provide for a slight clearance between the ends of the thrashing elements or loops 19ᶜ and the adjacent face of said members upon rotation of said wheels. The members 25 are shown in the drawings as constructed of metal and as being of double wall construction, but this need not be, as these members may, obviously, be constructed of other materials and of different designs. Mounted on the outer face of each of the outside stationary members 25 are a plurality of thrashing elements 25ᶜ, substantially the same in design as the thrashing elements 19ᶜ carried by the wheels 19. The center stationary thrashing member also carries a plurality of thrashing elements 25ᶜ, these, however, being disposed on both sides of this member and designed to cooperate, respectively, with the two intermediate thrashing wheels. In other words, the center stationary thrashing element 25 is common to the two intermediate wheels 19. The thrashing elements 25ᶜ are also arranged in series properly spaced apart, and each series is in the form of an arc concentric with respect to the shaft 18 and are designed, upon operation of the machine, to project between the series of thrashing elements carried by the thrashing wheels, as more clearly appears in Fig. 5 of the drawings.

Suitably supported from the lower edges of the stationary thrashing members or boards 25 are conveyor troughs 26. The lateral areas between the outer thrashing wheels and their adjacent stationary thrashing boards and the space between the two intermediate thrashing wheels and the center stationary board are termed "thrashing zones". The conveyor troughs 26 extend longitudinally of the machine from a point well in advance of the thrashing wheels to a point in arrears thereof, and throughout their length underlie the thrashing zones just described.

The troughs 26 are adapted to catch the grain or seed as the latter is removed from the standing vegetation during the thrashing operation, and, in order to eliminate any possible waste, the said troughs are provided with outwardly flared side walls 26ª. A pair of channel beams 26ᵇ are mounted in each of the conveyor troughs and extend from the front end of the latter to the rear thereof, the rear ends being secured in any suitable manner to a transverse angle bar 27 and throughout their length at suitable intervals, by means of metal straps or the like 27ª, to the lower edges of the stationary thrashing boards 25. The channel beams 26ᵇ are mounted with their channels disposed inwardly, so as to provide a suitable housing and support for the endless chain conveyors 28, the latter comprising sprocket chains 28ª, having mounted thereon at suitable intervals brushes or the like 28ᵇ. The chains 28ª engage idle sprocket wheels 28ᶜ, mounted on suitable shafts journalled adjacent the front ends of the channel beams 26ᵇ, and sprocket wheels 28ᵈ keyed to a drive shaft 28ᵉ extending transversely of the machine and suitably journalled in the beams adjacent the rear ends thereof. The drive shaft 28ᵉ is, preferably, of sectional construction, as shown more clearly in Fig. 9, each section being loosely pinned to adjacent sections so as to permit of a certain amount of free play, to avoid binding, twisting or breaking of the shaft when the machine is operating over uneven ground.

A substantially L-shaped bracket 29 is rigidly mounted on the angle bar 27 at the rear of the center conveyor trough, this bracket extending rearwardly from its point of attachment and upwardly, substantially as shown in Fig. 3 of the drawings. At its upper end this bracket is provided with two journal bearings $29^a$ and $29^b$, the former extending transversely with respect to the longitudinal axis of the machine and the latter extending longitudinally of the machine, but being slightly inclined with respect to said axis. A relatively short shaft 30 is mounted in the bearing $29^b$, and upon the rear end of this shaft is mounted a grain elevator wheel 31. The other end of the shaft is provided with a bevel gear $30^a$, which meshes with a bevel gear $32^a$, mounted on the corresponding end of the shaft 32 journalled in the bearing $29^a$. This latter shaft is also supported adjacent its other end by means of a bracket 33, similar to the bracket 29, previously described. The bracket 33 is also mounted on the angle bar 27. The outer end of the shaft 32 is provided with a sprocket wheel $32^b$, which is operatively connected with the sprocket wheel 34 carried on the corresponding end of the conveyor drive shaft $28^e$ by means of a sprocket chain 35.

The elevator wheel 31 comprises a suitable hub portion, which is carried by the outer end of the inclined shaft 30, previously described, and radiating from the hub are a plurality of arms $31^a$, the latter being provided at their ends with scoops or the like $31^b$. Suitably secured to the under portion of the machine and partially enclosing the elevator wheel, is a sheet metal drum 36, said drum closely fitting the wheel 31 in such wise that upon rotation thereof the scoops $31^b$ will coact with the inner periphery of the drum in elevating the grain or seed, in a manner hereinafter described. The front portion of the drum underlies the rear ends of the conveyor troughs, and the bottom of the drum extends below the bottoms of said troughs, so as to form, in effect, a receiving pocket $36^a$ for the grain as the same is swept rearwardly through the conveyor troughs. This pocket is common to all of the conveyor troughs, and accordingly all of the thrashed grain or seed is deposited in this pocket.

Upon operation of the machine the grain as it is deposited in the pocket $36^a$ is picked up by the scoops $31^b$ of the elevator wheel, the latter being geared to rotate at such speed that the grain may fall by gravity from the scoops during their travel across the upper portion of the drum. On each arm of the wheel, imediately beneath the scoop at the end thereof, is positioned an inclined deflector plate $31^c$, and the rear wall $36^b$ of the drum 36 which, as will be observed, only covers substantially the lower half of the wheel 31, is also provided with a plate $36^c$ in the form of a downwardly turned flange along its upper edge. The grain, as it falls from the scoops $31^b$ in the manner just described, is deflected by the plates $31^c$ and $36^c$ rearwardly of the drum and into a suitable bin or storage receptacle 37. This bin or storage receptacle is mounted on the rear stationary frame 22, previously described, and is enclosed, save for its top, by the box or body 21, also previously described. Mounted across the upper end of the bin is a screen $37^a$, the latter being slightly inclined, as shown, and adapted to screen from the grain or seed, as the latter is deposited in the bin, all foreign material, such as straw, weeds, and the like, the latter being easily removed through the opening 38 provided in the rear wall of the box 21. The bin 37, being mounted on the stationary frame 22 of the machine, is spaced sufficiently from the rear wall $36^b$ of the drum 36 to permit the movement of the latter upon oscillation of the tiltable frame 16. It will be appreciated from the foregoing that the conveyor troughs and associated mechanism and elevator wheels, its drum and driving connections, are all raised or lowered upon oscillation of the frame 16 by means of the hoisting cables previously described, this being due to the fact that all of these portions of the machine are suspended from the front end of the frame 16 through their connections one to the other, and ultimately to the stationary thrashing boards 25, which are pivoted to the frame immediately beneath the shaft which carries the thrashing wheels.

Suitably secured to the stationary frame 22 of the machine and exteriorly of the box 21 is an upstanding bracket 39, carrying at its upper end a transverse shaft $39^a$ having mounted thereon two sprocket wheels $39^b$ and $39^c$, the former being operatively connected to the shaft 15 by means of a sprocket chain 40 and sprocket wheel $15^b$, keyed to said shaft. The sprocket wheel $39^c$ is operatively connected to the conveyor drive shaft $28^e$ by means of a sprocket chain 41 and sprocket wheel 42, keyed to said shaft. The shaft 15 is also provided with a sprocket wheel $15^c$ adjacent its inner end, this sprocket wheel being operatively connected to the shaft 18 by means of a chain 43 and sprocket wheel $18^a$. As previously described, the shaft 32 is operatively connected by means of sprocket and chain to the conveyor drive shaft $28^e$.

From the foregoing description of the power-transmitting mechanism of the machine, it will be apparent that upon movement of the latter power will be transmitted to all of the driven elements of the entire mechanism from the main drive sprocket 11. A suitable clutch 60 is mounted on the shaft 15 immediately adjacent the sprocket wheel $15^a$, and may be operated by means of a lever 61, to render the parts operative or inoperative during the movement of the machine.

Mounted on the stationary frame 22 of the machine, directly opposite the bracket 39, is a bracket 44, of substantially the same construction as the bracket 39. This bracket 44 also carries at its upper end a transverse shaft 44ª, and extending between this shaft and the conveyor drive shaft 28ᵉ is a radius rod 45, this rod being pivoted at one end to the shaft 44ª and to the corresponding end of the conveyor drive shaft at its other end. At the other side of the machine another radius rod 45 connects the shaft 39ª with the other end of the conveyor drive shaft. The brackets 39 and 44 being stationary, and the conveyor drive shaft 28ᵉ being movable upon oscillation of the tiltable frame 16, it will be observed that the radius rods will function to prevent undue separation of the elevator wheel and associated parts from the bin 37 when the frame 16 is adjusted. In other words, the rear end of the movable or adjustable portion of the machine is maintained operatively disposed with relation to the rear stationary portion of the machine by means of this radius rod construction. These radius rods also serve to maintain the conveyor troughs in a more or less horizontal plane, regardless of the position into which the frame 16 is adjusted. This will be appreciated when it is remembered that the stationary thrashing boards 25, from which the conveyor mechanism and associated elements of the construction are suspended, are pivotally swung from the end of the frame 16.

Projecting forwardly of the machine from the front ends of the conveyor troughs are a plurality of cone-shaped separators or dividers 46, these devices being adapted to separate the standing vegetation into rows as the machine is moved forwardly, and to guide the vegetation thus separated into the thrashing zones, as will be understood. These dividers 46 are provided with upwardly inclined fin-like portions 46ª which extend rearwardly and are attached, respectively, to the upper front corners of the stationary thrashing boards lying immediately to the rear thereof. The portions of the dividers 46 which overlie the front ends of the conveyor trough are cut away, as at 46ᵇ, in order that any grain falling in advance of the thrashing mechanism will be caught by said troughs.

A cross beam 47, suitably reinforced, is supported slightly in advance of the frame 16 and above the thrashing wheels 19 by suitable rods or other supporting members which are mounted on the longitudinal members of the frame 16. Supported from this cross beam and above the dividers 46 are a plurality of auxiliary cone-shaped dividers 47ª, these being designed to aid in the separation of the grain. Two forwardly projecting beams 48 are pivoted at 48ᵈ, one on either side of the machine outside of the thrashing mechanism, these beams being supported near their outer ends by means of the stay rods 48ª connected to the cross beam 47. Through these connections these beams 48 are raised and lowered with the frame 16, the cross beam 47, as previously described, being supported by rods mounted on said frame. At the outer end of the beams 48 wing-like elements 48ᵇ are disposed, and extending rearwardly from these elements are a plurality of guide rods 48ᶜ, these rods and the elements 48ᵇ being designed to cooperate with the outermost dividers 46 and 47ª in separating the vegetation and in guiding the same to the outermost thrashing zones. The auxiliary dividers 47ª are also preferably supported from the cross beam 47 by means of adjustable straps 47ᵇ or the like, so that, if desired, the position of said dividers may be varied with respect to the main dividers 46.

The shaft or pole 23 at the rear of the machine is supported by means of the small steering wheel 24. This steering wheel is provided with an upwardly extending post suitably mounted and provided at its upper end with a hand wheel 49. A driver's seat 50 is mounted at a convenient point adjacent the steering wheel. An evener 23ª is mounted on the pole 23 in advance of the steering wheel, to which the draft animals may be hitched for propelling the machine during the thrashing operation. It will be readily appreciated, however, that modification of the machine may be effected to accommodate motive power in the form of a tractor or the like without departing from the spirit or scope of the invention.

In the operation of the machine the frame 16 is first adjusted to accommodate the vegetation to be acted upon. The machine is then pushed forward into the vegetation, and as this is done the dividers at the forward end thereof separate the vegetation into rows, four in number in the present machine, and these rows of vegetation are then guided into the respective thrashing zones, where each stalk is violently shaken in a lateral direction by the looped thrashing elements carried both by the thrashing wheels and the stationary thrashing boards. This violent shaking of the stalks of grain results in the separation of the grain therefrom, the same falling downwardly into the conveyor troughs which underlie the thrashing zones. As above described, each thrashing wheel comprises a plurality of fan blades. These fan blades are so arranged that upon rotation of the wheels currents of air are set up by each of the wheels in the direction of their respective stationary thrashing boards. Much of the grain which would otherwise be lost is caught in these currents of air and blown against the adjacent stationary board, which latter deflects the same downwardly and into the collection troughs. In the collection troughs the grain is moved rearwardly by means of the endless conveyors, and is deposited in the pocket 36ª at the rear of said troughs. From this point it is elevated by the elevator wheel and deposited in the stationary bin or storage receptacle at the rear of the machine.

Although I have shown and described one particular embodiment of the invention for purposes of illustration, it will be understood that it may be constructed in various other forms without departing from the scope of the invention as defined in the appended claims.

I claim:—

1. In a thrashing machine, a stationary frame, a tiltable frame, conveying mechanism carried by the latter, thrashing mechanism comprising rotatable members and cooperating non-rotatable members, said thrashing mechanism being also carried by said tiltable frame, said cover conveying mechanism and said non-rotatable members being pivotally suspended from said tiltable frame, and means for tilting the latter.

2. In a thrashing machine, a stationary frame, a tiltable frame, thrashing and conveying mechanism carried by the latter, said conveying mechanism and a portion of said thrashing mechanism being pivotally suspended from said tiltable frame, means for tilting the latter, and radius rods pivotally associated with said frames for controlling the movements of said pivoted parts upon actuation of said means.

3. In a thrashing machine, a stationary frame, a bin carried thereby, a tiltable frame, thrashing elements carried thereby, means to rotate said elements stationary thrashing elements pivotally suspended therefrom intermediate said revoluble elements, conveyor troughs depending from said stationary elements, a transfer pocket at the rear of said troughs and movable therewith upon oscillation of said tiltable frame, means associated with said pocket for transferring grain from the latter into said bin, means for actuating said tiltable frame to adjust the parts carried thereby to accommodate vegetation of different heights, and means for maintaining said transfer pocket and associated parts operatively disposed with respect to said bin during such adjustments.

4. In a thrashing machine, a stationary frame, a tiltable frame, conveying mechanism carried by the latter, thrashing mechanism comprising rotatable elements and cooperating rotatable and non-rotatable thrashing elements also carried by the latter, means to rotate said rotatable elements said conveying mechanism and the non-rotatable elements of said thrashing mechanism being pivotally suspended from said tiltable frame, means for tilting the latter, and means associated with said frames for controlling the movements of said pivoted parts upon actuation of said first-named means.

5. In a thrashing machine, thrashing mechanism, conveyor means disposed to receive the thrashed grain therefrom, a transfer pocket into which said grain is moved by said conveyor means, a bin adjacent said pocket, an elevator wheel mounted in the latter in such wise that a portion of its periphery overhangs said bin, and means for operating said wheel to elevate the grain from said pocket and deposit same in said bin.

6. In a thrashing machine, thrashing mechanism, conveyor means disposed to receive the thrashed grain therefrom, a transfer pocket into which said grain is moved by said conveyor means, a bin adjacent said pocket, an elevator wheel mounted in the latter in such wise that a portion of its periphery overhangs said bin, and means for operating said wheel to elevate the grain from said pocket and deposit same in said bin, said bin being stationary and said thrashing and conveying mechanisms including the transfer pocket and elevator wheel being vertically adjustable to accommoderate vegetation of different heights.

7. In a thrashing machine, thrashing mechanism, conveyor means disposed to receive the thrashed grain therefrom, a transfer pocket into which said grain is moved by said conveyor means, a bin adjacent said pocket, an elevator wheel mounted in the latter in such wise that a portion of its periphery overhangs said bin, means for operating said wheel to elevate the grain from said pocket and deposit same in said bin, said bin being stationary and said thrashing and conveying mechanisms including the transfer pocket and elevator wheel being vertically adjustable to accommodate vegetation of different heights, and means whereby an operative relation between said pocket, elevator wheel and bin is maintained regardless of the position into which said adjustable parts have been adjusted.

8. In a thrashing machine, a tiltable frame, actuating means at one end thereof, thrashing wheels at the other end thereof, thrashing boards pivoted to said frame beneath said wheels and coacting therewith during rotation of the latter, and means underlying said thrashing elements for collecting the grain as the latter is thrashed.

9. In a thrashing machine, a tiltable frame, actuating means at one end thereof, thrashing wheels means to rotate the same, thrashing boards pivoted to said frame beneath said wheels and coacting therewith upon rotation of the latter, conveyor troughs carried by said thrashing boards and extending rearwardly of the machine, a transfer pocket at the end of said troughs, a stationary frame adjacent said pocket, a bin mounted thereon, means for conveying grain from said pocket to said bin, and radius rods connecting the ends of said troughs with said stationary frame.

10. In a machine for thrashing standing grain, a plurality of coacting revoluble and stationary thrashing elements, means to rotate said revoluble elements conveyor troughs therebeneath, and devices at the forward ends of said troughs for dividing the standing vegetation into rows as the machine passes through the latter, said devices being provided with rearwardly and upwardly projecting fin-like portions connected to said stationary thrashing elements.

11. In a thrashing machine, a plurality of coacting revoluble and stationary thrashing members, means to rotate said revoluble members, the former being in the form of wheels having fan blades, and a plurality of outwardly projecting loop-like elements arranged circularly in a plurality of radially spaced apart concentric series on the face of said wheels, said stationary thrashing members being in the form of boards interposed between said wheels and provided with outwardly projecting loop-like elements arranged in arcuate formation and adapted to project between the said series of elements on said wheels.

12. In a thrashing machine, thrashing mechanism a plurality of longitudinal conveyors arranged to receive said thrashed grain, a transfer pocket at the rear thereof, a bin adjacent said pocket, and an elevator wheel mounted in said pocket and overhanging said bin for transferring grain from the former to the latter means to actuate said wheel.

13. In a thrashing machine, thrashing mechanism a plurality of longitudinal conveyors arranged to receive said thrashed grain, a transfer pocket at the rear thereof, a bin adjacent said pocket, an elevator wheel mounted in said pocket and overhanging said bin for transferring grain from the former to the latter, said wheel comprising a plurality of radially disposed arms carrying scoops at their outer ends, and deflecting elements spaced inwardly from said scoops means to actuate said wheel.

14. In a thrashing machine; a tiltable frame, revoluble thrashing elements supported thereon, means to rotate said elements, stationary thrashing elements pivotally suspended therefrom, conveyor troughs secured to said stationary elements, and means for tilting said frame.

15. In a thrashing machine, thrashing mechanism, collection troughs therebeneath, a transfer pocket adjacent the rear ends of said troughs, means for conveying grain through said troughs to said pocket, a bin adjacent said pocket, and an inclined elevator wheel adapted to transfer the grain from said pocket to said bin.

16. In a thrashing machine, a tiltable frame, thrashing mechanism and conveyor means carried by said frame, a shaft extending transversely of said machine and adapted to operate said conveyor means, a stationary frame, and radius rods connecting said shaft to said frame.

17. In a thrashing machine, thrashing mechanism, and a collection trough extending longitudinally of the machine below said mechanism, said trough being pivotally supported at its opposite ends.

18. In a thrashing machine, a stationary frame, a movable frame, thrashing mechanism carried by the latter, and a collection trough extending longitudinally of the machine below said mechanism, said trough being pivotally attached at its forward end to said movable frame and at its rear end to said stationary frame.

19. In a machine for thrashing standing grain, a plurality of thrashing elements, conveyor means therebeneath, means in advance of said thrashing elements for dividing the standing vegetation into rows as the machine passes through the latter, and auxiliary dividing means located above said first-named dividers and in vertical alinement therewith.

20. In a machine for thrashing standing grain, a plurality of thrashing elements, conveyor means therebeneath, means in advance of said thrashing elements for dividing the standing vegetation into rows as the machine passes through the latter, and auxiliary dividing means located above said first-named dividers and in vertical alinement therewith, said auxiliary dividing means being adjustable.

In testimony whereof, I have subscribed my name.

GUSTAV PAUL LUEDKE.

Certificate of Correction.

It is hereby certified that in Letters Patent No. 1,604,458, granted October 26, 1926, upon the application of Gustav Paul Luedke, of Springfield, Illinois, for an improvement in "Thrashing Machines," an error appears in the printed specification requiring correction as follows: Page 5, line 24, claim 1, strike out the word "cover"; and that the said Letters Patent should be read with this correction therein that the same may conform to the record of the case in the Patent Office.

Signed and sealed this 30th day of November, A. D. 1926.

[SEAL.]

M. J. MOORE,
*Acting Commissioner of Patents.*